(12) United States Patent
Bae et al.

(10) Patent No.: US 11,394,063 B2
(45) Date of Patent: Jul. 19, 2022

(54) COOLING SYSTEM FOR TEMPERATURE REGULATION AND CONTROL METHOD THEREOF

(71) Applicants: Hyundai Motor Company, Seoul (KR); Kia Motors Corporation, Seoul (KR)

(72) Inventors: Hyo-Chan Bae, Hwaseong-si (KR); Tae Hee Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 395 days.

(21) Appl. No.: 16/673,663

(22) Filed: Nov. 4, 2019

(65) Prior Publication Data

US 2020/0274210 A1    Aug. 27, 2020

(30) Foreign Application Priority Data

Feb. 25, 2019   (KR) .......................... 10-2019-0021943

(51) Int. Cl.
*H01M 10/63*      (2014.01)
*H01M 10/48*      (2006.01)
(Continued)

(52) U.S. Cl.
CPC ......... *H01M 10/63* (2015.04); *H01M 10/486* (2013.01); *H01M 10/6556* (2015.04);
(Continued)

(58) Field of Classification Search
CPC ............... H01M 10/63; H01M 10/486; H01M 10/6556; H01M 10/6568; H01M 10/663; H01M 10/625; H01M 10/613; H01M 10/615; B60L 58/26; B60L 58/27; Y02E 60/10; Y02T 10/70; B60H 1/00885; B60H 1/00278; B60H 1/00807; B60H 1/034; B60H 1/143; B60H 1/00921;
(Continued)

(56) References Cited

U.S. PATENT DOCUMENTS 10,406,888 B2 *   9/2019   Cheng ................ B60H 1/00885
10,717,337 B2 *   7/2020   Kim .................... H01M 10/625
(Continued)

FOREIGN PATENT DOCUMENTS

KR   10-2010-0063348 A   6/2010
KR   10-2012-0015446 A   2/2012

*Primary Examiner* — Len Tran
*Assistant Examiner* — Gustavo A Hincapie Serna
(74) *Attorney, Agent, or Firm* — Morgan, Lewis & Bockius LLP

(57) ABSTRACT

A cooling system for temperature control may include a first cooling passage in which a plurality of first variable valves and a heat generating component are deployed; a second cooling passage in which a plurality of first variable separating pipes cross-connected to the plurality of first variable valves, respectively, a battery, a heater configured to raise a temperature of the battery, and a battery chiller configured to cool the battery are deployed; a temperature sensor configured to detect operating temperatures of the heater and the battery chiller; and a controller configured to operate the plurality of first variable valves by determining whether the operating temperatures are within a specific range.

16 Claims, 5 Drawing Sheets

(51) Int. Cl.
*H01M 10/6568* (2014.01)
*H01M 10/6556* (2014.01)
*B60L 58/27* (2019.01)
*B60L 58/26* (2019.01)

(52) U.S. Cl.
CPC ......... *H01M 10/6568* (2015.04); *B60L 58/26* (2019.02); *B60L 58/27* (2019.02)

(58) Field of Classification Search
CPC ........... B60H 2001/00307; B60H 2001/00928; B60H 2001/00942; B60H 2001/00949; B60H 1/00907
USPC .......................................................... 165/287
See application file for complete search history.

(56) References Cited

U.S. PATENT DOCUMENTS

| | | | | |
|---|---|---|---|---|
| 10,829,005 B2* | 11/2020 | Onozawa | ............ | H01M 10/625 |
| 10,967,702 B2* | 4/2021 | Mancini | ............. | B60H 1/00921 |
| 11,088,408 B2* | 8/2021 | Takazawa | ............ | H01M 10/633 |
| 2012/0055725 A1 | 3/2012 | Mizoguchi | | |
| 2012/0225341 A1* | 9/2012 | Major | ................ | B60H 1/00278 429/120 |
| 2012/0297809 A1* | 11/2012 | Carpenter | ............... | B60L 50/66 62/244 |
| 2012/0304674 A1* | 12/2012 | Schwarzkopf | ..... | B60H 1/00878 62/238.1 |
| 2014/0096550 A1* | 4/2014 | Gao | ........................ | B60L 1/003 62/115 |
| 2016/0107505 A1* | 4/2016 | Johnston | ............ | B60H 1/00278 165/202 |
| 2016/0344075 A1* | 11/2016 | Blatchley | .............. | B60W 10/30 |
| 2017/0158081 A1* | 6/2017 | Kim | .................. | H01M 10/613 |
| 2018/0117991 A1* | 5/2018 | Kim | .................. | B60H 1/00392 |
| 2018/0222286 A1* | 8/2018 | Blatchley | ........... | B60H 1/00885 |
| 2018/0345758 A1* | 12/2018 | Oh | ...................... | B60H 1/00385 |
| 2019/0135075 A1* | 5/2019 | Hwang | .................. | F25B 41/40 |
| 2019/0234290 A1* | 8/2019 | Jüstel | ...................... | F01P 7/167 |
| 2020/0047588 A1* | 2/2020 | Connell | ............. | G05D 23/1934 |
| 2020/0220236 A1* | 7/2020 | Durrani | ............ | H01M 10/667 |
| 2020/0238818 A1* | 7/2020 | Takazawa | ............... | F01P 7/162 |
| 2020/0287255 A1* | 9/2020 | Herrmann | ........... | H01M 10/625 |
| 2021/0316593 A1* | 10/2021 | Ishizeki | .............. | B60H 1/00764 |
| 2021/0370747 A1* | 12/2021 | Lee | ........................... | F25B 41/24 |
| 2022/0085435 A1* | 3/2022 | Honjo | ................. | H01M 10/633 |
| 2022/0097567 A1* | 3/2022 | Lian | .................... | H01M 10/633 |

\* cited by examiner

COOLING SYSTEM FOR TEMPERATURE REGULATION AND CONTROL METHOD THEREOF

CROSS-REFERENCE TO RELATED APPLICATION

The present application claims priority to Korean Patent Application No. 10-2019-0021943, filed on Feb. 25, 2019, the entire contents of which is incorporated herein for all purposes by this reference.

BACKGROUND OF THE INVENTION

Field of the Invention

The present invention relates to cooling technology for temperature regulation, and particularly, to a cooling system for temperature control and a control method thereof, which can improve battery efficiency of a green car.

Description of Related Art

In case of a green car, a motor-battery integrated cooling system or a motor-battery separated cooling system is applied as a cooling system.

The motor-battery integrated cooling system requires an increase of battery/motor capacities to increase a range and an output of the car, but it has the drawback that battery cooling efficiency/performance becomes insufficient because both the motor and the battery are cooled using the same heat exchanger. Furthermore, because of an operation of an air conditioner chiller for proper cooling when battery cooling water is overheated, the range is reduced.

On the other hand, the motor-battery separated cooling system is to complement the problems of the motor-battery integrated cooling system. In other words, in winter season, the motor-battery separated cooling system serves as a circuit for operating a heater to heat water for temperature increase when battery cooling water is overcooled (heater-on). In spring and autumn seasons, it serves as a cooling circuit for maintaining the battery cooling water at a proper temperature (heater-on/off~separated cooling~ chiller on/off repetition). In summer season, it serves as a circuit for operating a battery chiller for cooling when the battery cooling water is overheated (chiller-on).

Accordingly, in case of applying the separated cooling, it is not possible to utilize the waste heat of the motor in an initial startup period and at an ambient temperature lower than a predetermined temperature value, and thus an operation period of the heater for heating the water is increased because of the insufficient battery temperature increase to aggravate the fuel economy. That is, the separated cooling is concentrated on the summer season and cooling of high-temperature water, and thus the problem that the battery temperature may be increased because of lowering of the battery temperature in the winter season has been overlooked.

Furthermore, since the usage frequency of the heater for heating the battery cooling water for the temperature increase is heightened, the problem of the range reduction also occurs in the winter season.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cooling system for temperature control, which can improve fuel economy through battery cooling performance improvement and/or chiller operation reduction.

Furthermore, various exemplary embodiments of the present invention provide a cooling system for temperature control, which can complement the problem of fuel economy deterioration and maintain an efficient battery operation condition when a temperature raising system (heater for heating water) operates to improve battery operation efficiency in winter season or on a low-temperature condition in a separated cooling system.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, a cooling system for temperature control is provided, which can improve the fuel economy through battery cooling performance improvement and/or chiller operation reduction.

The cooling system for temperature control may include a first cooling passage in which a plurality of first variable valves and a heat generating component are deployed; a second cooling passage in which a plurality of first variable branch pipes cross-connected to the plurality of first variable valves, respectively, a battery, a heater configured to raise a temperature of the battery, and a battery chiller configured to cool the battery are deployed; a temperature sensor configured to detect operating temperatures of the heater and the battery chiller; and a controller configured to operate the plurality of first variable valves by determining whether the operating temperatures are within a specific range.

One of the plurality of first variable valves is deployed on a discharge side based on the heat generating component and the other of the plurality of first variable valves is deployed on an inlet side of the heat generating component to recover waste heat from the heat generating component.

The specific range is between the operating temperature of the heater and the operating temperature of the battery chiller.

The operating of plurality of the first variable valves is circularly carried on to raise a temperature of cooling water of the battery up to a preset temperature.

The operating of plurality of the first variable valves is performed in an initial startup period and at an ambient temperature lower than a predetermined temperature value.

The first cooling passage is a passage through which circulating water which is heated by a first radiator mounted on the first cooling passage circulates.

The second cooling passage is a passage through which cooling water which is cooled by a second radiator mounted on the second cooling passage and operating at a lower temperature than a temperature of the first radiator circulates.

The heater is a heater for heating water and is deployed between the battery chiller and the battery.

A second variable valve is deployed on a discharge side of the second cooling passage based on the battery and a second variable branch pipe cross-connected to the second variable valve is deployed on an inlet side of the second cooling passage to separately cool the heat generating component and the battery.

In accordance with various exemplary embodiments of the present invention, a method for controlling a cooling system for temperature control including a first cooling passage in which a plurality of first variable valves and a heat generating component are deployed, and a second cooling passage in which a plurality of first variable branch pipes cross-connected to the plurality of first variable valves, respectively, a battery, a heater configured to raise a temperature of the battery, and a battery chiller configured to cool the battery are deployed, the method may include detecting, by a temperature sensor, operating temperatures of the heater and the battery chiller; and operating, by a controller, the plurality of variable valves by determining whether the operating temperatures are within a specific range.

It is to be understood that both the foregoing general description and the following detailed description of the present invention are exemplary and explanatory and are intended to provide further explanation of the disclosure as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
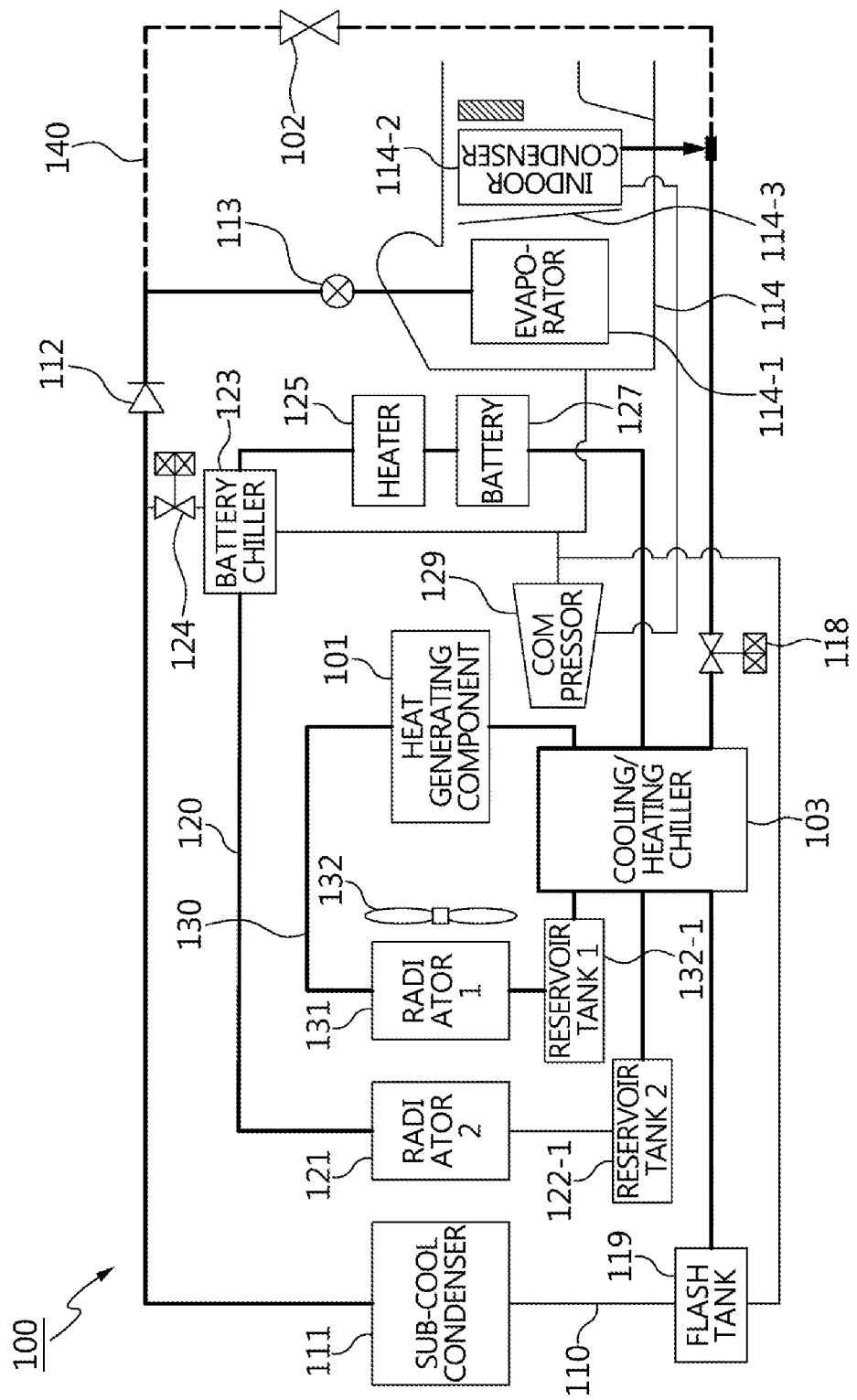
FIG. 1 is a circuit diagram of a cooling system for temperature control according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The above-described objects, features, and advantages will be described in detail with reference to the accompanying drawings, and accordingly, those of ordinary skill in the art to which the present invention pertains will be able to easily embody the technical concept of the present invention.

In describing the present invention, well-known technologies related to the present invention are not described in detail in the case where it is determined that they obscure the subject matter of the present invention in unnecessary detail. Hereinafter, exemplary embodiments of the present invention will be described with reference to the accompanying drawings. In the drawings, the same drawing reference numerals are used for the same or similar constituent elements.

FIG. 1 is a circuit diagram of a cooling system for temperature control 100 according to an exemplary embodiment of the present invention. Referring to FIG. 1, the cooling system for temperature control includes a first cooling passage 130, a second cooling passage 120, a third cooling passage 110, and a fourth cooling passage 140 extending from the third cooling passage 110.

In the first cooling passage 130, a first reservoir tank 132-1 configured to store circulating water, a first radiator 131 configured to cool the circulating water flowing out of the first reservoir tank 132-1, a fan 132, and a heat generating component 101 may be deployed.

The second cooling passage 120 is a passage in which cooling water is circulated. In the second cooling passage 120, a second radiator 121 configured to cool the cooling water flowing out of a second reservoir tank 122-1 by dissipating heat of the cooling water in ambient air, a heater 125 configured to heat the cooling water flowing out of the second radiator 121, and a battery chiller 123 configured to cool the cooling water flowing out of the second radiator 121.

In other words, if the cooling water for cooling a battery 127 is overcooled, the heater 125 is turned on to raise the temperature. In contrast with this, if the cooling water for cooling the battery 127 is overheated, the battery chiller 123 is turned on to lower the temperature. Accordingly, to maintain the cooling water for cooling the battery at a proper temperature, the heater 125 and the battery chiller 123 are selectively turned on/off. Accordingly, a cooling circuit is implemented to repeat "heater-on/off~separated cooling battery chiller on/off".

The separated cooling means a cooling method through separation of the heat generating component 101 and the battery 127 from each other. That is, a power electronics (PE) loop cools only the heat generating component 101, and a battery loop cools only the battery 127.

Furthermore, the second cooling passage 120 is connected to a passage formed on a battery cooling plate mounted on the battery 127.

On the other hand, the first radiator 131 is a high-temperature radiator, and the second radiator 121 is a low-temperature radiator. Accordingly, the second cooling passage 120 is a passage for circulating the cooling water which is cooled by the second radiator 121 operating at a lower temperature than the temperature of the first radiator 131.

In the third cooling passage 110, a sub-cool condenser 111 configured to condense a refrigerant flowing out of a compressor 129, a check valve 112 configured to circulate the refrigerant flowing out of the sub-cool condenser 111 in one direction thereof, a first expansion valve 113 configured to primarily expand the refrigerant flowing out of the sub-cool condenser 111, an air conditioner 114 configured to evaporate the refrigerant flowing out of the first expansion valve 113, a second expansion valve 118 configured to secondarily expand the refrigerant flowing out of the air conditioner 114, a cooling/heating chiller 103 configured to cool the refrigerant flowing out of the second expansion valve 118 or to perform heating through recovering of waste heat, and a flash tank 119 configured to store the refrigerant flowing out of the compressor 120 and the refrigerant flowing out of the cooling/heating chiller 130.

Accordingly, a circulation is performed in the order of compression (high-temperature high-pressure gas)→condensation (middle-temperature high-pressure liquid)→expansion (low-temperature low-pressure wet stream)→evaporation (low-temperature low-pressure gas).

The cooling/heating chiller 103 recovers the waste heat generated from the heat generating component 101 or is configured as a heat exchanger for heat exchange of the refrigerant and the cooling water.

The air conditioner 114 is configured to implement heating and cooling. For this, the air conditioner 114 includes an evaporator 114-1 configured to evaporate the refrigerant flowing out of the first expansion valve 113, an internal condenser 114-2 configured to generate heat through condensation of the refrigerant flowing out of the compressor 129, and a temperature door 114-3 configured to adjust a mixing ratio between air cooled by the evaporator 114-1 and air heated by the internal condenser 114-2 and to discharge the mixed air to duct. Of course, an actuator is configured to operate the temperature door 114-3.

The battery chiller 123 is configured to cool the cooling water through heat exchange between the low-temperature refrigerant the state of which has been converted through an electronic expansion valve 124 and the cooling water of the second cooling passage 120. The cooling water cooled by the battery chiller 123 cools the battery 127. The refrigerant having passed through the battery chiller 123 flows toward the evaporator 114-1.

In the fourth cooling passage 140, an on-off valve 102 which is connected to the check valve 112 to make the refrigerant bypass the air conditioner 114 is deployed.

In the instant case, cooling of the heat generating component in accordance with the first cooling passage 130 is managed so that the cooling water temperature is about 65 to 75° C. or less.

Furthermore, cooling of the battery in accordance with the second cooling passage 120 is managed so that the cooling water temperature is about 35° C. or less to manage the battery at a constant temperature.

Furthermore, cooling of the air conditioner in accordance with the third cooling passage 110 is performed in parallel with internal cooling using the cooling/heating chiller 103 using the refrigerant when the battery is overheated.

Figure 2:
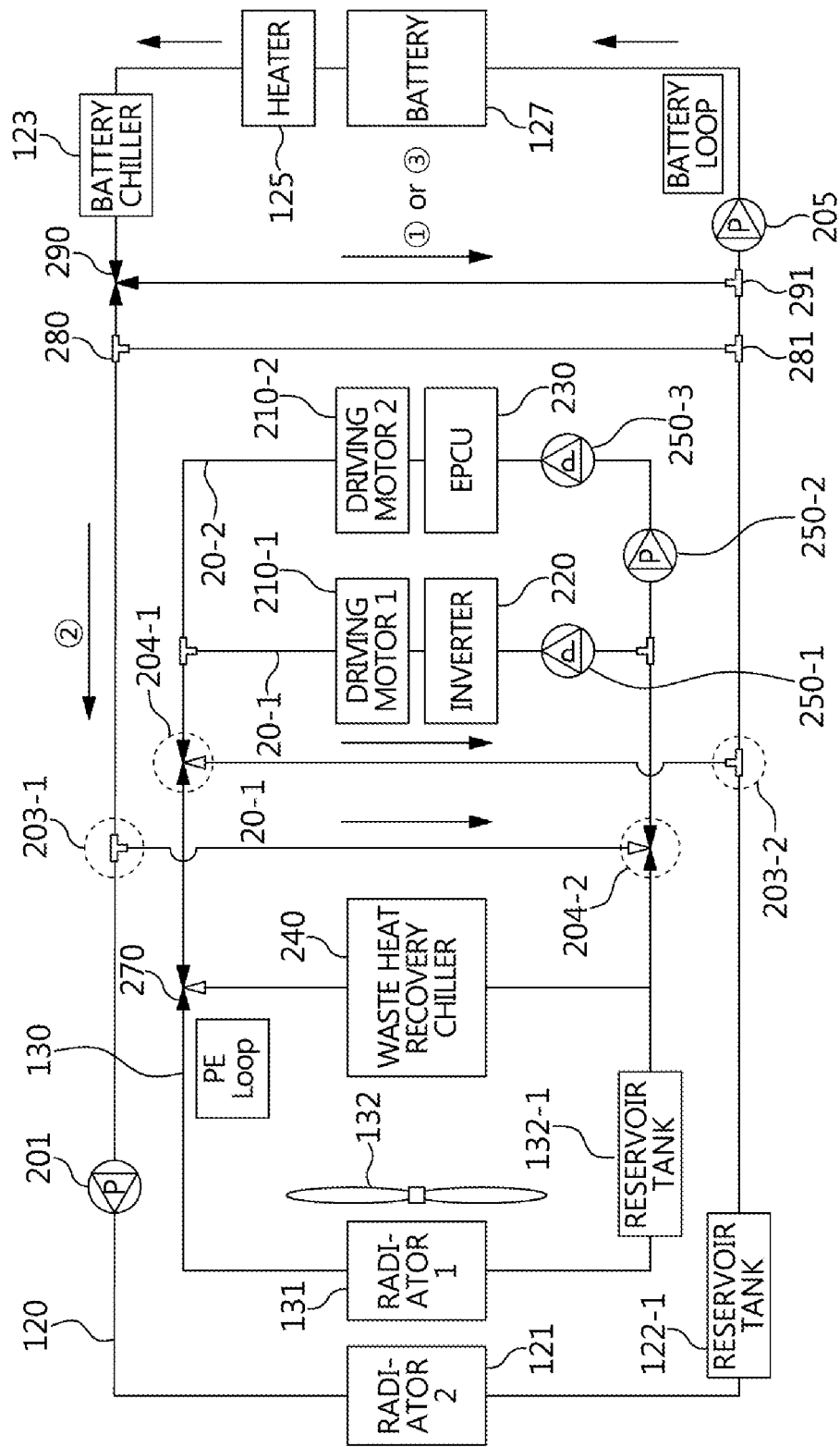
FIG. 2 is a detailed circuit diagram of a portion of a cooling system for temperature control illustrated in FIG. 1.

FIG. 2 is a detailed circuit diagram of a portion of a cooling system for temperature control illustrated in FIG. 1. Referring to FIG. 2, in the first cooling passage 130, a (1-1)-th variable valve 204-1, a (1-2)-th variable valve 204-2, a (1-3)-th variable valve 270, and first to third circulation pumps 250-1, 250-2, and 250-3 are provided. In other words, in the first cooling passage 130, a (3-1)-th sub-cooling passage and a (3-2)-th sub-cooling passage, in which driving motors and electronic components are deployed, are additionally provided. In the (3-1)-th sub-cooling passage 20-1, a first driving motor 210-1, an inverter 220, and the first circulation pump 250-1 are deployed, and in the (3-2)-th sub-cooling passage 20-2, a second driving motor 210-2, an electric power control unit (EPCU) 230, and the third circulation pump 250-3 are deployed. Of course, the second circulation pump 250-2 is deployed on the first circulation pump 250-1 and the third circulation pump 250-3 to distribute circulation water toward the third circulation pump 250-3.

Furthermore, a waste heat recovery chiller 240 is connected to the (1-3)-th variable valve 270.

In the second cooling passage 120, a fourth circulation pump 201, a (1-1)-th variable branch pipe 203-1 connected to the (1-2)-th variable valve 204-2, a (1-2)-th variable branch pipe 203-2 connected to the (1-1)-th variable valve 204-1, a pair of (2-1)-th and (2-2)-th variable branch pipes 280 and 281 crossing before the battery chiller 123, a second variable valve 290, a second variable branch pipe 291 cross-connected to the second variable valve 290, and a fifth circulation pump 205 deployed at a rear end portion of the second variable branch pipe 291 to circulate the cooling water toward the battery 127 are deployed.

The variable valve is a three-way valve, and the variable branch pipe is 3-way branch pipe. Of course, a four-way valve and a 4-way branch pipe may also be used.

The second variable valve 290 and the second variable branch pipe 291 are configured to separately cool the heat generating component 101 and the battery 127. That is, a battery loop is formed by operating the second variable valve 290 to make the cooling water flowing toward the second radiator 121 flow toward the second variable branch pipe 291 only.

On the other hand, in case of the separated cooling, the (1-1)-th variable valve 204-1 and the (1-2)-th variable valve 204-2 are opened, and thus the cooling water is circulated only in the first cooling passage 130 to form a PE loop.

In FIG. 2, ① to ③ mean operations in divided seasons as follows.

① (winter season): If the battery cooling water is overcooled, the heater 125 for temperature raising is turned on.

③ (summer season): If the battery cooling water is overheated, the battery chiller 123 for cooling is turned on.

② (spring and autumn seasons): The cooling circuit for maintaining the battery cooling water at a proper temperature is operated (heater-on/off~separated cooling~battery chiller on/off repetition).

Figure 3:
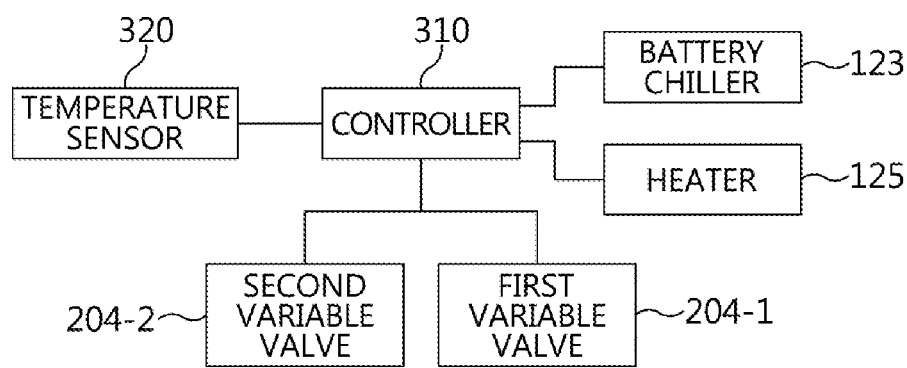
FIG. 3 is a diagram illustrating a connection between some constituent elements and a controller illustrated in FIG. 1 and FIG. 2.

FIG. 3 is a diagram illustrating a connection between some constituent elements and a controller 310 illustrated in FIG. 1 and FIG. 2. Referring to FIG. 3, a controller 310 is connected to a temperature sensor 320 configured to detect the operating temperatures of the second heater 125 and the battery chiller 123, the first variable valve 204-1, and the second variable valve 204-2 to communicate with them. The controller 310 controls to adjust the operating time of the second heater 125 by warming up the temperature of the cooling water of the battery 127 in early stages using the waste heat of the motor driving when the temperature raising heater operates in the initial startup period and/or at the low ambient temperature. To drive software having an algorithm to implement this or a program and to store data, the controller 310 may include a microprocessor, a memory, and an electronic circuit.

Figure 4:
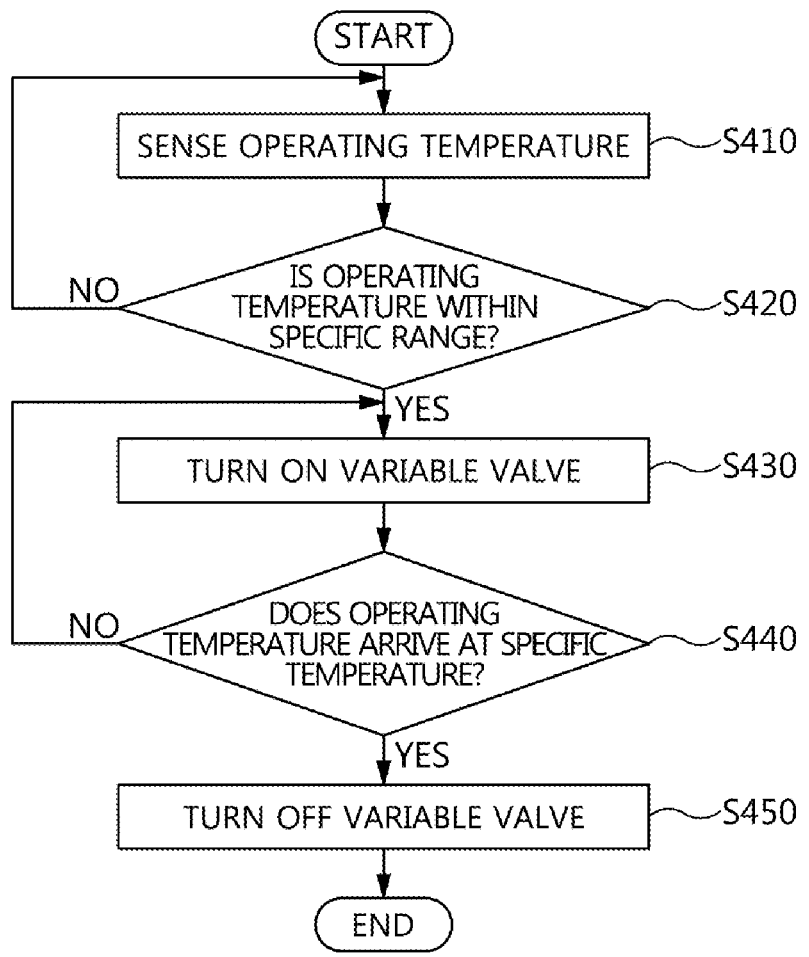
FIG. 4 is a flowchart illustrating a cooling process for temperature regulation according to an exemplary embodiment of the present invention.

FIG. 4 is a flowchart illustrating a cooling process for temperature regulation according to an exemplary embodiment of the present invention. Referring to FIG. 4, the temperature sensor 320 detects the operating temperatures of the heater and the battery chiller (S410).

Thereafter, the controller 310 determines whether the operating temperature is within a specific range (S420). That is, the specific range for the operation condition is between the operating temperature A (e.g., 20° C.↓) of the heater 125 and the operating temperature B (e.g., 35° C.↑) of the battery chiller 123. Here, ↓ means a lower limit or less of the specific range, and ↑ means an upper limit or less of the specific range.

At operation S420, if the operating temperature is within the specific range, the variable valve is turned on, and an operating logic is executed. The operating logic operates in the operation order of the (1-1)-th variable valve 204-1→the (1-1)-th variable branch pipe 203-2 (waste heat of the heat generating component 101→battery cooling water temperature raising)→warmup (temperature raising) of the battery 127→the (1-2)-th variable branch pipe 203-1→operation of the (1-2)-th variable valve 204-2 (at the present time, the second radiator 121 is interrupted)→recovery of the waste heat of the heat generating component 1012→battery 127. The circulation is continued until the cooling water temperature of the battery 127 rises to the specific temperature.

Thereafter, if the operating temperature arrives at the specific temperature, the variable valve is turned off (S440 and S450). Thereafter, the mode is switched to the heat generating component (in particular, motor)—battery separated cooling mode.

Figure 5:
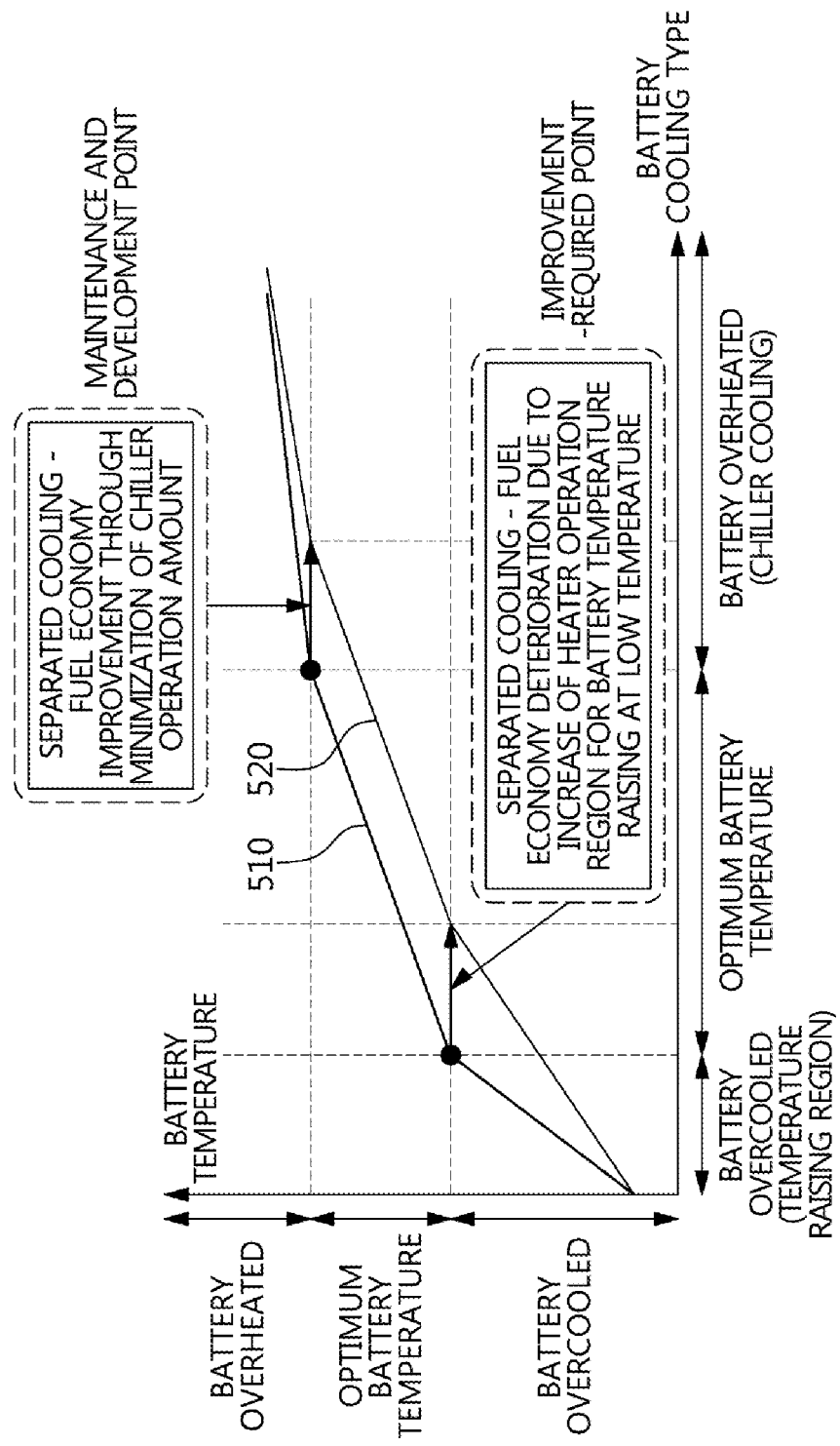
FIG. 5 is a graph illustrating effects according to an exemplary embodiment of the present invention.

FIG. 5 is a graph illustrating effects according to an exemplary embodiment of the present invention. Referring to FIG. 5, a curve 510 represents an effect of the heat generating component and battery integrated cooling system, whereas a curve 520 represents an effect of the heat generating component-battery separated cooling system. Accordingly, the two systems as described above are used according to circumstances, and thus fuel economy may be prevented from being deteriorated.

The method or algorithm as described above in relation to the exemplary embodiments as included herein may be implemented in a form of program instructions which may be performed through various computer means, such as a microprocessor, a processor, and a central processing unit (CPU), and may be recorded on a computer readable medium. The computer readable medium may include program (instructions) codes, data files, and data structures solely or in combination.

The program (instructions) codes that are recorded on the medium may be specially designed and configured for an exemplary embodiment of the present invention, or may be known and available to computer software providers. Examples of the computer readable recording media may include magnetic media, such as a hard disk, a floppy disk, and a magnetic tape, optical media, such as a CD-ROM, a DVD, and a Blu-ray, and semiconductor memory devices specially configured to store and perform the program (instructions) codes, such as a ROM, a RAM, and a flash memory.

Here, examples of the program (instructions) codes may include not only machine codes that are made by compilers but also high-class language codes which may be executed by computers using interpreters and the like. The above-described hardware devices may be configured to operate as one or more software modules to perform the operation according to an exemplary embodiment of the present invention, and vice versa.

According to an exemplary embodiment of the present invention, since the temperature of the battery cooling water is warmed up in early stages using the waste heat of the heat generating component when the temperature raising heater operates in the initial startup period and at the low ambient temperature, the heater operating time may be reduced, and thus fuel economy may be improved.

Furthermore, according to an exemplary embodiment of the present invention, since the battery is maintained at a proper temperature, the battery efficiency may be improved, and the durability of the battery may be increased.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cooling system for temperature control, the cooling system comprising:
    a first cooling passage in which a plurality of first variable valves and a heat generating component are mounted;
    a second cooling passage in which a plurality of first variable branch pipes cross-connected to the plurality of first variable valves, respectively, a battery, a heater configured to raise a temperature of the battery, and a battery chiller configured to cool the battery are mounted;
    a temperature sensor configured to detect operating temperatures of the heater and the battery chiller; and
    a controller configured to operate the plurality of first variable valves by determining when the operating temperatures of the heater and the battery chiller are within a predetermined range,
    wherein a second variable valve is mounted on the second cooling passage in a discharge side of the second cooling passage based on the battery, and
    wherein a second variable branch pipe cross-connected to the second variable valve is mounted on the second cooling passage in an inlet side of the second cooling passage based on the battery, wherein the heat generating component and the battery are separately cooled.

2. The cooling system according to claim 1,
    wherein one of the plurality of first variable valves is mounted on the first cooling passage in a discharge side based on the heat generating component, and wherein another of the plurality of first variable valves is mounted on the first cooling passage in an inlet side of the heat generating component, wherein the cooling system recovers waste heat from the heat generating component.

3. The cooling system according to claim 1, wherein the predetermined range is between the operating temperature of the heater and the operating temperature of the battery chiller.

4. The cooling system according to claim 1, wherein the operating of the plurality of the first variable valves is to circulate cooling water to raise a temperature of cooling water of the battery up to a predetermined temperature.

5. The cooling system according to claim 1, wherein the operating of the plurality of the first variable valves is performed in an initial startup period and at an ambient temperature lower than a predetermined temperature value.

6. The cooling system according to claim 1, wherein the first cooling passage is a passage through which cooling water, which passes through a first radiator mounted on the first cooling passage, circulates.

7. The cooling system according to claim 6, wherein the second cooling passage is a passage through which cooling water circulates, and wherein the cooling water of the second cooling passage is cooled by a second radiator mounted on the second cooling passage, and wherein the second radiator operates at a lower temperature than a temperature of the first radiator.

8. The cooling system according to claim 1, wherein the heater is mounted between the battery chiller and the battery and configured for heating water.

9. A method of controlling a cooling system for temperature control including a first cooling passage in which a plurality of first variable valves and a heat generating component are mounted, and a second cooling passage in which a plurality of first variable branch pipes cross-connected to the plurality of first variable valves, respectively, a battery, a heater configured to raise a temperature of the battery, and a battery chiller configured to cool the battery are mounted, the method comprising:
  detecting, by a temperature sensor, operating temperatures of the heater and the battery chiller; and
  operating, by a controller, the plurality of first variable valves by determining when the operating temperatures of the heater and the battery chiller are within a predetermined range,
  wherein a second variable valve is mounted on the second cooling passage in a discharge side of the second cooling passage based on the battery, and
  wherein a second variable branch pipe cross-connected to the second variable valve is mounted on the second cooling passage in an inlet side of the second cooling passage based on the battery, wherein the heat generating component and the battery are separately cooled.

10. The method according to claim 9, wherein one of the plurality of first variable valves is mounted on the first cooling passage in a discharge side based on the heat generating component, and wherein another of the plurality of first variable valves is mounted on the first cooling passage in an inlet side of the heat generating component, wherein the cooling system recovers waste heat from the heat generating component.

11. The method according to claim 9, wherein the predetermined range is between the operating temperature of the heater and the operating temperature of the battery chiller.

12. The method according to claim 9, wherein the operating of the plurality of the first variable valves is to circulate cooling water to raise a temperature of cooling water of the battery up to a predetermined temperature.

13. The method according to claim 9, wherein the operating of the plurality of the first variable valves is performed in an initial startup period and at an ambient temperature lower than a predetermined temperature value.

14. The method according to claim 9, wherein the first cooling passage is a passage through which cooling water, which passes through a first radiator mounted on the first cooling passage, circulates.

15. The method according to claim 9, wherein the second cooling passage is a passage through which cooling water circulates, and wherein the cooling water of the second cooling passage is cooled by a second radiator mounted on the second cooling passage, and wherein the second radiator operates at a lower temperature than a temperature of the first radiator.

16. The method according to claim 9, wherein the heater is mounted between the battery chiller and the battery and configured for heating water.

* * * * *